(12) United States Patent
Zhou et al.

(10) Patent No.: US 8,971,828 B2
(45) Date of Patent: Mar. 3, 2015

(54) PREDISTORTION DEVICE, METHOD FOR PREDISTORTION, AND TRANSMITTER/RECEIVER SYSTEM THAT REUSE AN ANALOG RECEIVING CIRCUIT IN A HALF DUPLEXING SYSTEM AND A FULL DUPLEXING SYSTEM, AND THAT REDUCE THE REQUIREMENT ON THE ANALOG RECEIVING CIRCUIT

(75) Inventors: Jianmin Zhou, Beijing (CN); Pei Chen, Beijing (CN); Hui Li, Beijing (CN); Zhan Shi, Beijing (CN)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 13/399,156

(22) Filed: Feb. 17, 2012

(65) Prior Publication Data

US 2012/0214428 A1 Aug. 23, 2012

(30) Foreign Application Priority Data

Feb. 18, 2011 (CN) .......................... 2011 1 0041052

(51) Int. Cl.
*H04B 1/04* (2006.01)
*H04L 27/36* (2006.01)
(52) U.S. Cl.
CPC .................... *H04L 27/368* (2013.01)
USPC ..................... 455/114.3; 455/114.2; 375/284; 375/296
(58) Field of Classification Search
CPC .......... H04B 3/23; H04B 1/0475; H04B 1/10; H04B 1/52; H04B 2001/0425; H04B 1/525; H04B 2001/0433; H04L 25/03343; H04L 27/2626; H04L 27/2647; H04L 2025/03808; H04L 25/03012; H04L 27/368

USPC ......... 370/201, 252, 280, 286, 289, 335, 401, 370/493; 375/219, 221, 222, 226, 233, 235, 375/257, 260, 296, 297, 345, 346, 350, 375/355; 455/114.2, 114.3, 126, 296, 307, 455/323, 286, 339, 319, 337, 77, 78
See application file for complete search history.

(56) References Cited

U.S. PATENT DOCUMENTS

| 6,493,543 B1 * | 12/2002 | Shin et al. ...................... 455/126 |
| 7,248,642 B1 * | 7/2007 | Vella-Coleiro ............... 375/296 |
| 2007/0005326 A1 * | 1/2007 | Koppl et al. .................... 703/14 |
| 2011/0149714 A1 * | 6/2011 | Rimini et al. .................. 370/201 |

FOREIGN PATENT DOCUMENTS

| CN | 101534133 A | 9/2009 |
| CN | 101753182 A | 6/2010 |

OTHER PUBLICATIONS

Office Action dated Apr. 2, 2014, from Chinese Application No. 201110041052X.

* cited by examiner

*Primary Examiner* — Golam Sorowar
(74) *Attorney, Agent, or Firm* — Katten Muchin Rosenman LLP

(57) ABSTRACT

The embodiments of the present invention provide a predistortion device, method for predistortion and transmitter/receiver system. The predistortion device comprises a predistortion unit, and the predistortion device further comprises: a signal acquiring unit to process the output signals of a transmitting circuit to obtain distorted signals; a signal coupling unit to couple the distorted signals acquired by the signal acquiring unit to the receiving signals inputted to a receiving circuit; and a signal processing unit to decouple the output signals of the receiving circuit to acquire the distorted signals and the receiving signals. With the embodiments of the present invention, an analog receiving circuit may be reused in a half duplexing system and a full duplexing system, and the requirement on the analog receiving circuit is lowered, thereby reducing the cost.

10 Claims, 10 Drawing Sheets

PREDISTORTION DEVICE, METHOD FOR PREDISTORTION, AND TRANSMITTER/RECEIVER SYSTEM THAT REUSE AN ANALOG RECEIVING CIRCUIT IN A HALF DUPLEXING SYSTEM AND A FULL DUPLEXING SYSTEM, AND THAT REDUCE THE REQUIREMENT ON THE ANALOG RECEIVING CIRCUIT

TECHNICAL FIELD

The present invention relates to the field of wireless communication, and in particular relates to a predistortion device, method for predistortion and transmitter/receiver system.

BACKGROUND ART

As the development of communication technologies, various modulation manners of high spectrum efficiency are widely used. Modulation signals obtained by using various pulse-forming filters have very high frequency efficiencies; however, the amplitudes and phases of such modulation signals are variable, such variation requiring that the power amplifier in the transmitter has a linear property. Predistortion linearization technology is a common effective method, the principle of which being to make the whole system exhibiting a linear property by a predistortion device with a property contrary to the nonlinear property of the power amplifier.

FIG. 1 is a schematic diagram of digital predistortion of the prior art. As shown in FIG. 1, the signals of a transmitting circuit 101 may be fed back to a predistortion unit 103 by a predistortion feedback circuit 102, so that the predistortion unit 103 adjusts the transmission signals by using a predistortion coefficient. However, an additional feedback circuit (such as the predistortion feedback circuit 102) is needed in such a technical solution, and the feedback circuit has a high requirement on the bandwidth. For example, it requires that the feedback circuit has a very high linearity, and the bandwidth is 3 to 5 times of that of the signals of a receiving circuit, thereby resulting in very high cost.

Currently, some methods of reusing analog receiving circuit are used to solve the above problems. For example, in a time-division duplexing (TDD) communication system, a receiver circuit is used as a predistortion feedback circuit during the transmitting time. The system is switched over between a nonlinear calibration mode and a normal mode by an attenuator and a switch.

FIG. 2 is a schematic diagram of reusing an analog receiving circuit in the prior art. As shown in FIG. 2, when predistortion processing is needed, a switch 205 is used to connect an attenuator 204 and a receiving circuit 202, so that the signals of a transmitting circuit 201 are fed back to a baseband processing part 203 via the receiving circuit 202; and when signals are needed to be received, the switch 205 switches off the attenuator 204 and receiving circuit 202, so that the receiving circuit 202 receives signals from an antenna, thereby realizing normal signal receiving. In this way, the receiving circuit 202 may be used to feed distortion signals back to the baseband processing part 203, so as to realize predistortion processing, with no need of an additional predistortion feedback circuit.

However, in the implementation of the present invention, this applicant found that there exist defects in the above reusing technology: it is only applicable to a half duplexing system, such as time division duplexing (TDD), but is not applicable to a full duplexing system, such as frequency division duplexing (FDD). And even a half duplexing system has a very high requirement on the analog receiving circuit, thereby resulting in very high cost.

SUMMARY OF THE INVENTION

The embodiments of the present invention provide a predistortion device, method for predistortion and transmitter/receiver system, with an object being to reusing an analog receiving circuit in a half duplexing system and a full duplexing system, and to reduce the requirement on the analog receiving circuit.

According to an aspect of the embodiments of the present invention, there is provided a predistortion device, comprising a predistortion unit, and the predistortion device further comprises:

a signal acquiring unit connected to a transmitting circuit to process the output signals of the transmitting circuit so as to obtain distorted signals, the distorted signals being the distorted parts in the output signals of the transmitting circuit;

a signal coupling unit to couple the distorted signals acquired by the signal acquiring unit to the receiving signals inputted to a receiving circuit; and a signal processing unit to decouple the output signals of the receiving circuit to acquire the distorted signals and the receiving signals, to feed the distorted signals back to the predistortion unit, and to transmit the receiving signals to a baseband processing part.

According to another aspect of the embodiments of the present invention, there is provided a method for predistortion, comprising:

processing the output signals of a transmitting circuit to obtain distorted signals, the distorted signals being the distorted parts in the output signals of the transmitting circuit;

coupling the acquired distorted signals to the receiving signals inputted to a receiving circuit, so that the distorted signals are transmitted by reusing the receiving circuit; and decoupling the output signals of the receiving circuit to acquire the distorted signals and the receiving signals, to feed the distorted signals back to the predistortion unit, and to transmit the receiving signals to a baseband processing part.

According to still another aspect of the embodiments of the present invention, there is provided a transmitter/receiver system, comprising a baseband processing part, a transmitting circuit and a receiving circuit, and the transmitter/receiver system further comprises the predistortion device as stated above.

The advantages of the present invention exist in: by obtaining distorted signals from the output signals of a transmitting circuit and coupling the distorted signals to the input signals of a receiving circuit, not only an analog receiving circuit may be reused, but also applicable to a full duplexing system and a half duplexing system. Furthermore, the requirement on the analog receiving circuit may be lowered, thereby reducing the cost.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present invention, which constitute a part of the specification and does not constitute limitation to the present invention. In the drawings.

DETAILED DESCRIPTION OF THE INVENTION

The embodiments of the present invention are described as follows with reference to the drawings, for better understanding of the objects, technical solution and advantages of the present invention. Here, the exemplary embodiments of the present invention and their descriptions are for the explanation of the present invention, but not for limitation of the present invention.

Figure 1:
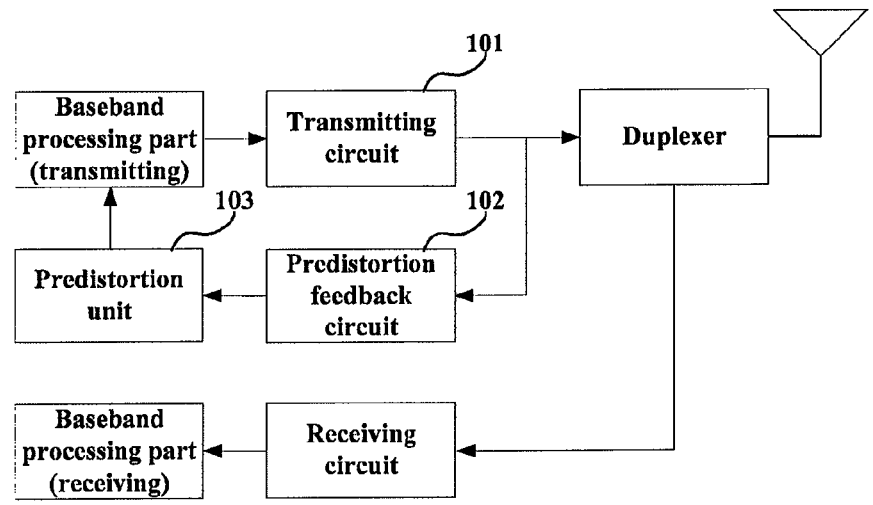
FIG. 1 is a schematic diagram of digital predistortion of the prior art.
Figure 2:
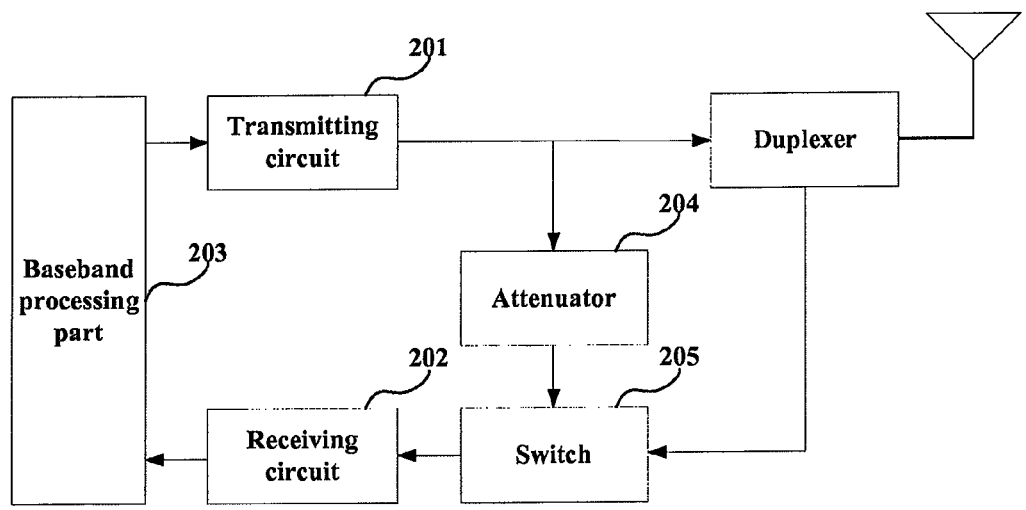
FIG. 2 is a schematic diagram of reusing an analog receiving circuit in the prior art.
Figure 3:
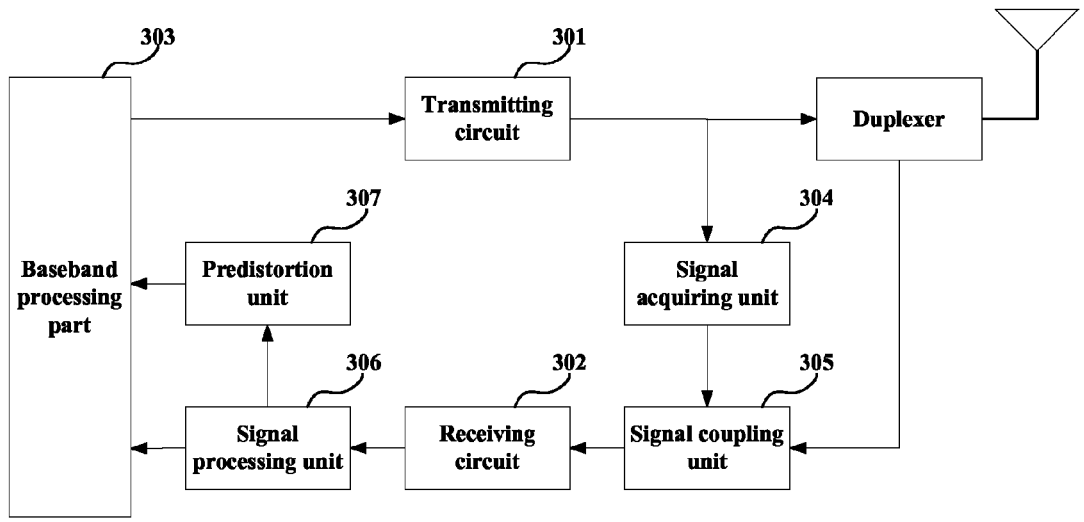
FIG. 3 is a schematic diagram of the structure of the predistortion device of an embodiment of the present invention.

The embodiments of the present invention provide a predistortion device, applicable to a transmitter/receiver system in a wireless system. FIG. 3 is a schematic diagram of the structure of the predistortion device of an embodiment of the present invention. As shown in FIG. 3, the predistortion device comprises: a signal acquiring unit 304, a signal coupling unit 305, a signal processing unit 306, and a predistortion unit 307; wherein the signal acquiring unit 304 is connected to a transmitting circuit 301, and the signal acquiring unit 304 is used to process the output signals of the transmitting circuit 301 so as to obtain distorted signals, the distorted signals being the distorted parts in the output signals of the transmitting circuit 301;

the signal coupling unit 305 couples the distorted signals acquired by the signal acquiring unit 304 to the receiving signals inputted to a receiving circuit 302; and the signal processing unit 306 decouples the output signals of the receiving circuit 302 to acquire the distorted signals and the receiving signals, feeds the distorted signals back to the predistortion unit 307, and transmits the receiving signals to a baseband processing part 303.

Figure 4:
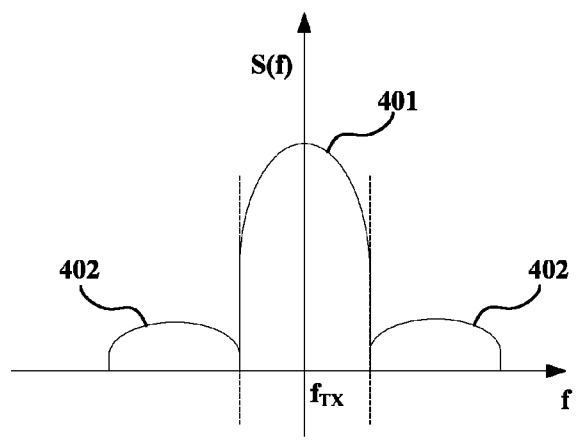
FIG. 4 is a schematic diagram of the output signals of the transmitting circuit of an embodiment of the present invention.

In this embodiment, due to the nonlinearity of a power amplifier in the transmitting circuit 301, the output signals of the transmitting circuit 301 will be distorted resulted from aberration. FIG. 4 is a schematic diagram of the output signals of the transmitting circuit of an embodiment of the present invention. As shown in FIG. 4, the output signals of the transmitting circuit may be divided into an in-band part 401 and an out-band part 402.

Figure 5:
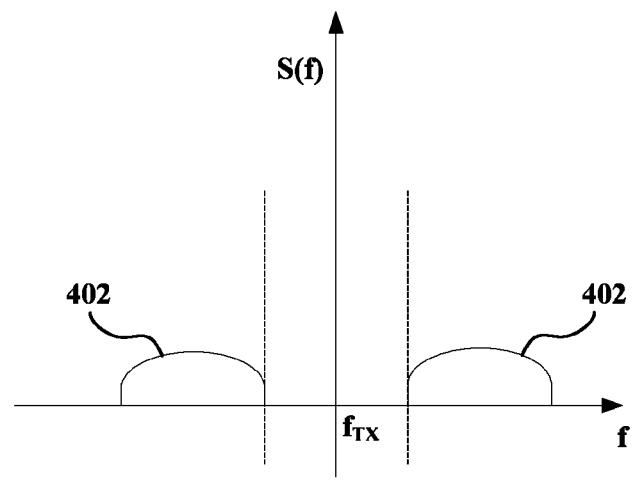
FIG. 5 is a schematic diagram of the acquired distorted signals of an embodiment of the present invention.

In this embodiment, the output signals of the transmitting circuit shown in FIG. 4 may be processed by the signal acquiring unit 304, so as to extract part of the distorted signals. FIG. 5 is a schematic diagram of the acquired distorted signals of an embodiment of the present invention. As shown in FIG. 5, the in-band signals 401 of the output signals of the transmitting circuit are eliminated, so as to obtain a distorted part as the distorted signals. What is described above is exemplary explanation of the distorted signals, but it is not limited thereto, and detailed implementations may be determined as actually required.

In an embodiment, in particular, the signal acquiring unit 304 may be a filter, which filters the in-band part in the output signals of the transmitting circuit, so as to obtain the distorted signals. Preferably, the filter may be an analog bandpass filter.

In another embodiment, the signal acquiring unit 304 may acquire the distorted signals in a manner of signal synthesis. For example, the signal acquiring unit 304 may comprise a phase reversing unit and a synthesizing unit; wherein the phase reversing unit reverses the in-band part in the output signals of the transmitting circuit, and the synthesizing unit is connected to the phase reversing unit and the output end of the transmitting circuit, and synthesizes the reversed signals outputted by the phase reversing unit and the output signals of the transmitting circuit, so as to obtain the distorted signals.

Figure 6:
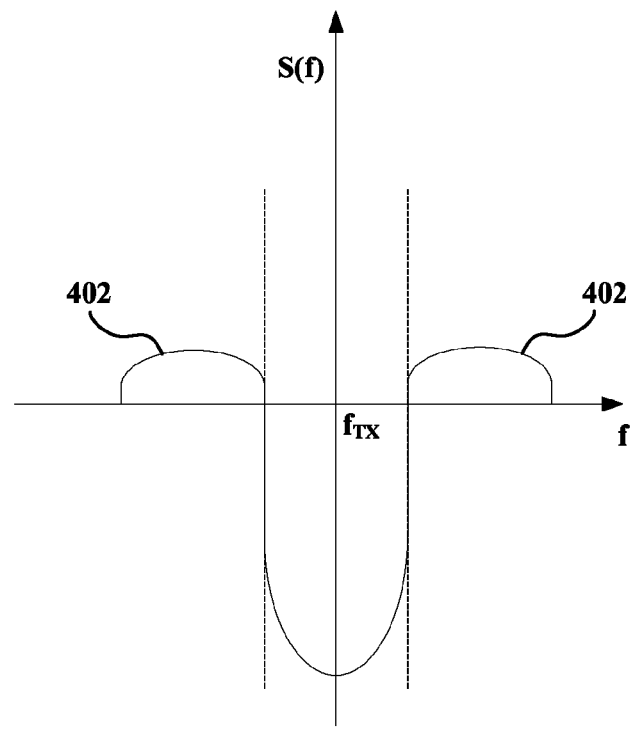
FIG. 6 is a schematic diagram of the in-band signals in the output signals in FIG. 4 after phase reversed.

FIG. 6 is a schematic diagram of the in-band part in the output signals in FIG. 4 after phase reversed. The synthesizing unit may obtain the distorted signals shown in FIG. 5 by adding up the signals shown in FIG. 6 and the signals shown in FIG. 4 and adjusting the amplitudes appropriately.

What is described above is exemplary explanation of the signal acquiring unit, but it is not limited thereto, and detailed implementations may be determined as actually required.

In this embodiment, the part of the distorted signals acquired by the signal acquiring unit 304 or the whole distorted signals may be coupled by the signal coupling unit 305 to the receiving signals inputted to the receiving circuit 302.

Figure 7:
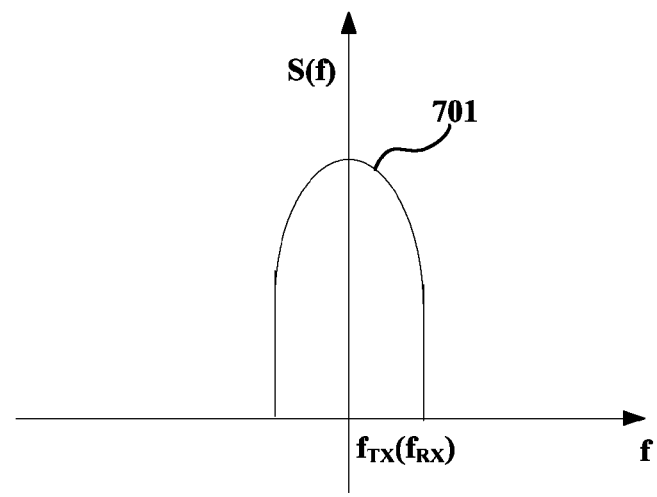
FIG. 7 is a schematic diagram of partial receiving signals obtained from a TDD system of an embodiment of the present invention.

FIG. 7 is a schematic diagram of the receiving signals obtained from a TDD system. The distorted signals may be coupled to the receiving signals by the signal coupling unit

Figure 8:
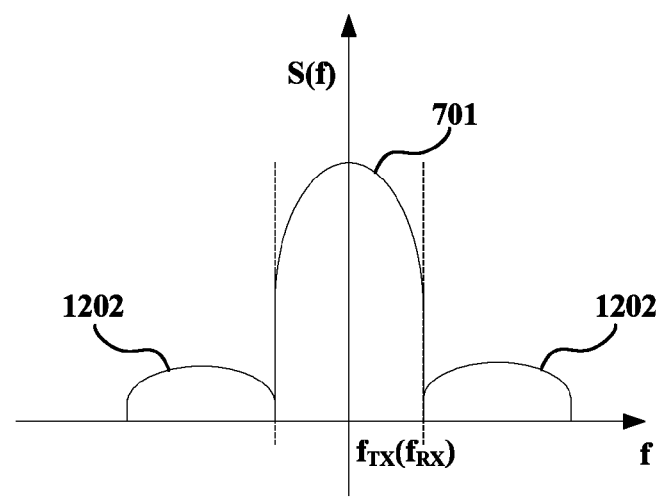
FIG. 8 is a schematic diagram of coupling the distorted signals to the receiving signals of an embodiment of the present invention.

305. FIG. 8 is a schematic diagram of coupling the distorted signals to the receiving signals of an embodiment of the present invention. As shown in FIG. 8, after the distorted signals and the receiving signals are coupled, the signals transmitted via the receiving circuit 302 may comprise receiving signals 701 and distorted signals 1202. Thus, the distorted signals may be fed back by the receiving circuit, and the goal of reusing the receiving circuit may be achieved, without needing an additional predistortion feedback circuit.

In this embodiment, the output signals of the receiving circuit 302 may be decoupled by the signal processing unit 306, so as to acquire distorted signals and receiving signals. For example, the signal processing unit 306 may obtain the distorted signals by filtering the receiving signals 701 in the signals shown in FIG. 8 by a bandpass filer, and feed the distorted signals back to the predistortion unit 307. Furthermore, the distorted signals in the signals shown in FIG. 8 may be filtered by a lowpass filer, so as to obtain the receiving signals 701, and the receiving signals are transmitted to the baseband processing part 303. However, it is not limited thereto, and detailed implementations may be determined as actually required. In this embodiment, no switch is used to switch over between a nonlinear calibration mode and a normal mode. Therefore, it is not only applicable to a half duplexing system, but also to a full duplexing system. In addition, different from the prior art in which the frequency of sampling of the analog receiving circuit needs a minimal 3 to 5 times of bandwidth (BW), the frequency of sampling of the embodiment of the present invention need only a minimal 2 times of BW, thereby lowering the requirement on the analog receiving circuit.

Figure 9A:
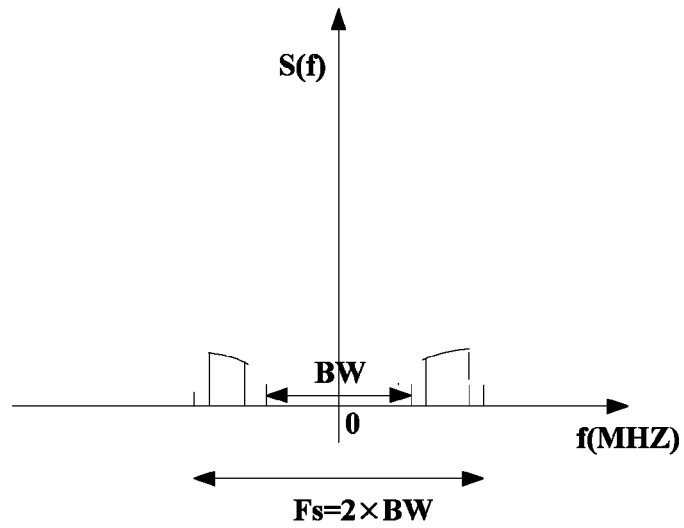
FIG. 9A is a schematic diagram of the receiving circuit of a TDD system with an ADC sampling rate being 2 times of the bandwidth.
Figure 9B:
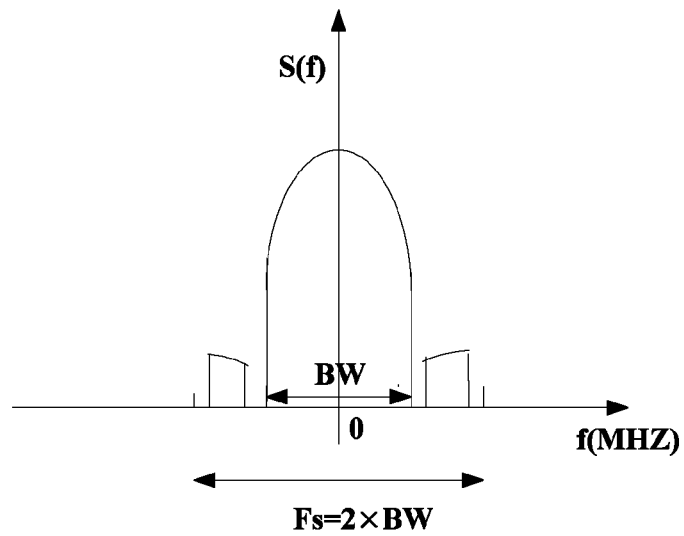
FIG. 9B is a schematic diagram of the receiving circuit of an FDD system with an ADC sampling rate being 2 times of the bandwidth.
Figure 10A:
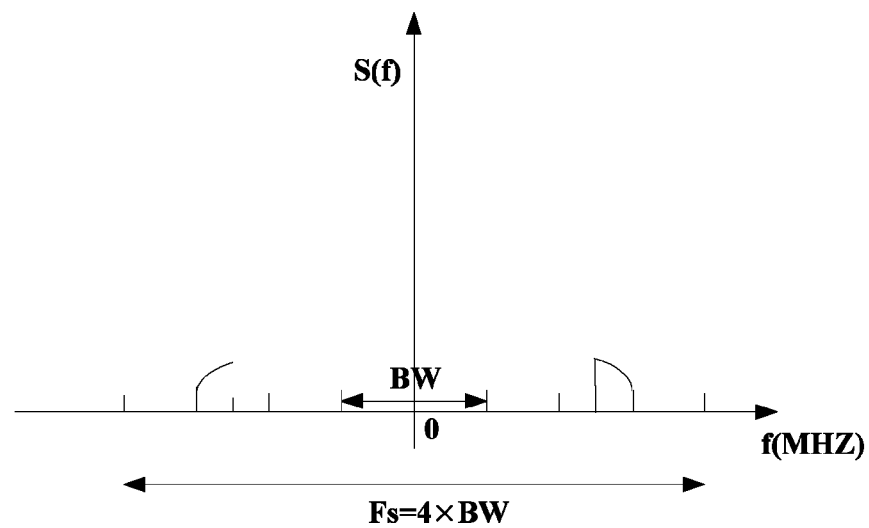
FIG. 10A is a schematic diagram of the receiving circuit of a TDD system with an ADC sampling rate being 4 times of the bandwidth.
Figure 10B:
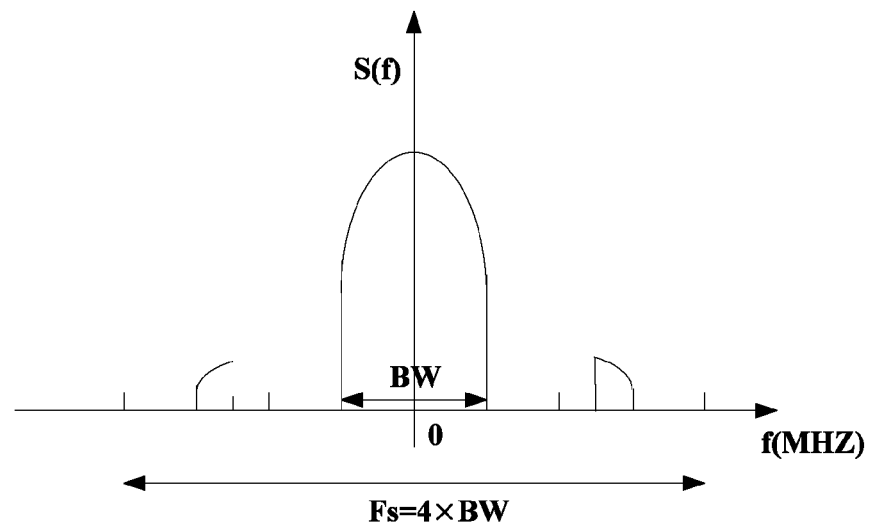
FIG. 10B is a schematic diagram of the receiving circuit of a FDD system with an ADC sampling rate being 4 times of the bandwidth.

FIGS. 9A and 9B are schematic diagrams of the receiving circuit with an analog to digital converter (ADC) sampling rate being 2 times of the bandwidth, wherein FIG. 9A is a schematic diagram of a TDD system, and FIG. 9B is a schematic diagram of an FDD system. FIGS. 10A and 10B are schematic diagrams of the receiving circuit with an ADC sampling rate being 4 times of the bandwidth, wherein FIG. 10A is a schematic diagram of a TDD system, and FIG. 10B is a schematic diagram of a FDD system.

Therefore, the embodiments of the present invention not only are applicable to a half duplexing system and a full duplexing system, but also have a relatively low requirement on the analog receiving circuit, thereby reducing the cost.

Figure 11:
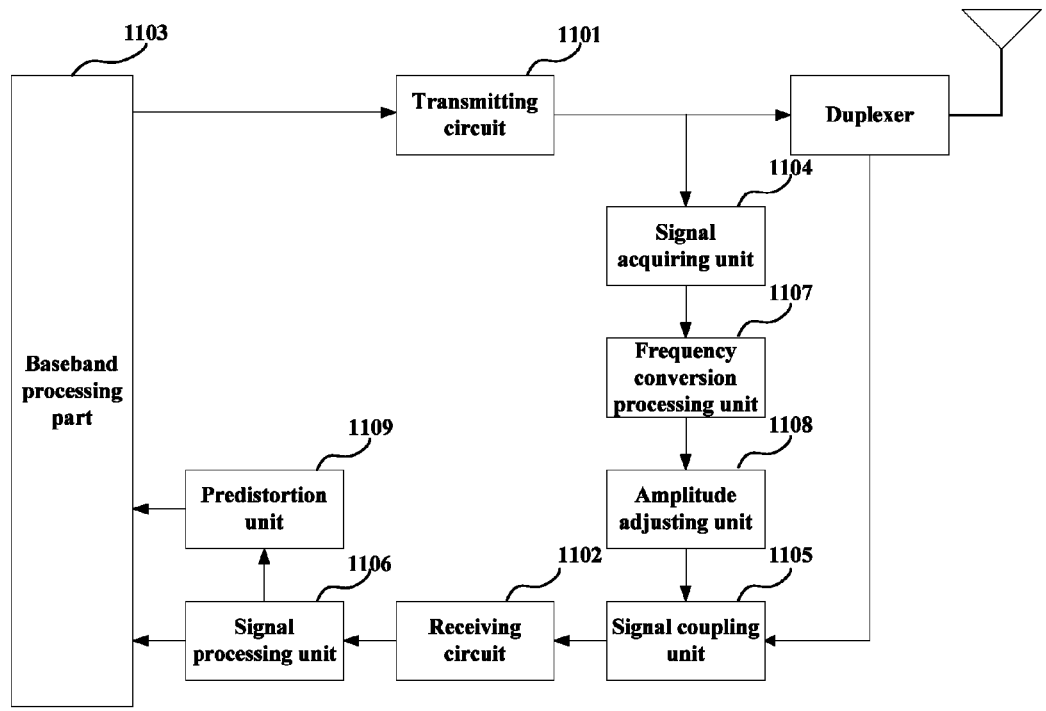
FIG. 11 is another schematic diagram of the structure of the predistortion device of an embodiment of the present invention.

FIG. 11 is another schematic diagram of the structure of the predistortion device of an embodiment of the present invention. As shown in FIG. 11, the predistortion device comprises: a signal acquiring unit 1104, a signal coupling unit 1105, a signal processing unit 1106, and a predistortion unit 1109, which are as stated above, and shall not be described any further.

Furthermore, as shown in FIG. 11, the predistortion device comprises a frequency conversion processing unit 1107, for performing frequency conversion on the distorted signals acquired by the signal acquiring unit 1104, and then transmitting them to the signal coupling unit 1105. Preferably, the frequency conversion processing unit 1107 may be realized by a mixer.

Figure 12:
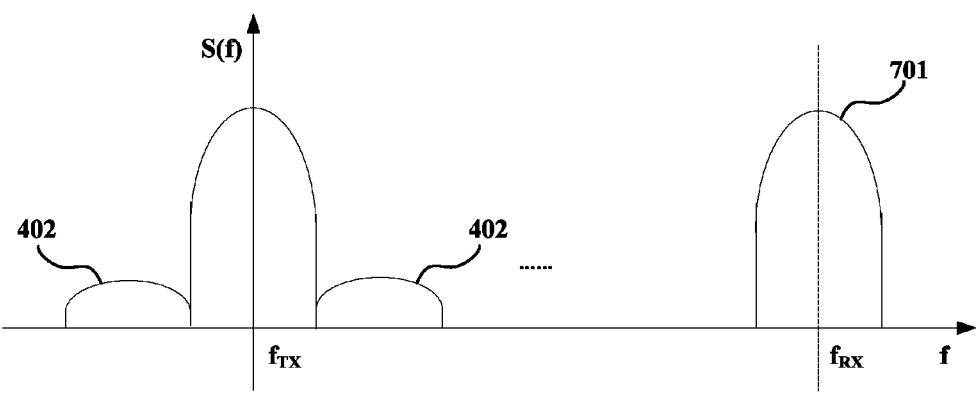
FIG. 12 is a schematic diagram of part of the receiving signals in the FDD system.
Figure 13:
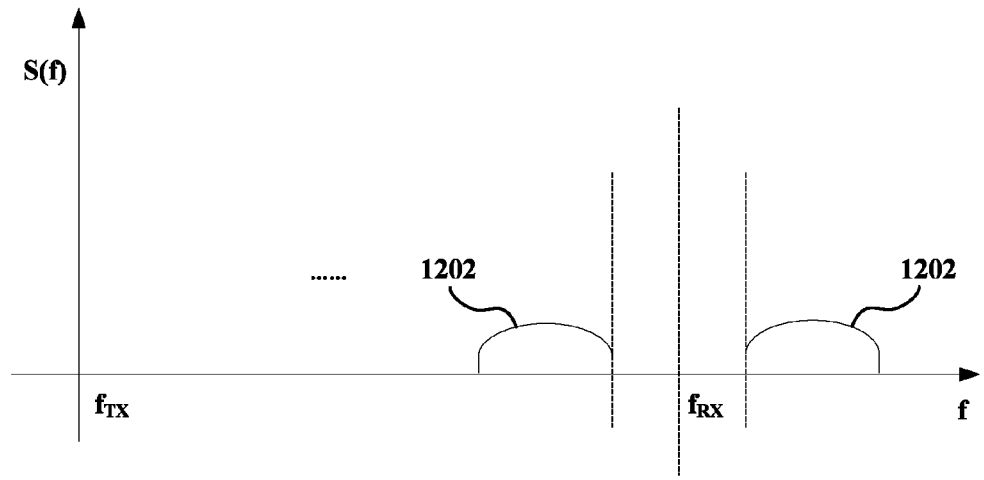
FIG. 13 is a schematic diagram of the distorted signals in FIG. 5 after frequency conversion.
Figure 14:
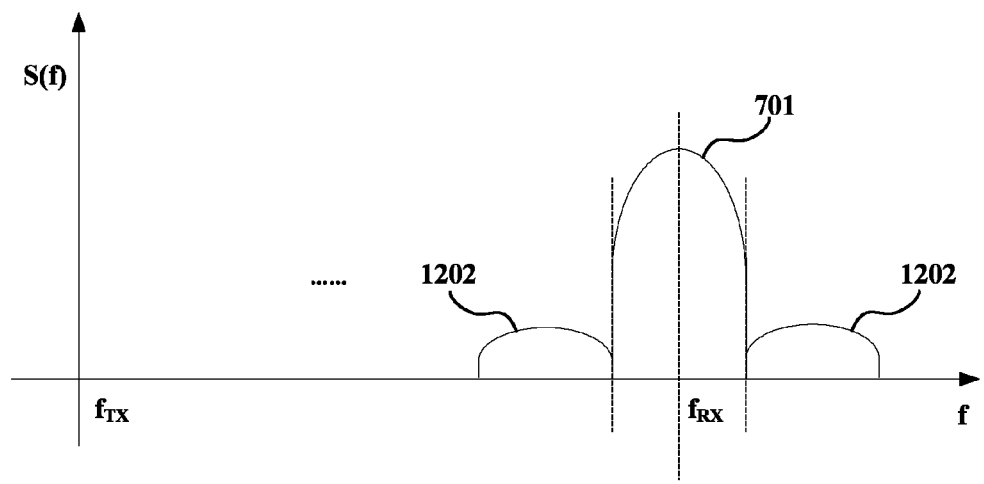
FIG. 14 is a schematic diagram of coupling the distorted signals in FIG. 5 after frequency conversion.

For example, FIG. 12 is a schematic diagram of part of the receiving signals in the FDD system. Since the transmission and receiving signals in the FDD system are in different frequency bands, frequency conversion is needed for compensating for the frequency differences. FIG. 13 is a schematic diagram of the distorted signals in FIG. 12 after frequency conversion, and FIG. 14 is a schematic diagram of the distorted signals coupled by the signal coupling unit 1105 after frequency conversion.

Furthermore, as shown in FIG. 11, the predistortion device may comprise an amplitude adjusting unit 1108, which adjusts the amplitude of the signals outputted by the frequency conversion processing unit 1107, and then transmits them to the signal coupling unit 1105. Preferably, the amplitude adjusting unit 1108 may be realized by an adjustable gain amplifier (D gm).

Figure 15:
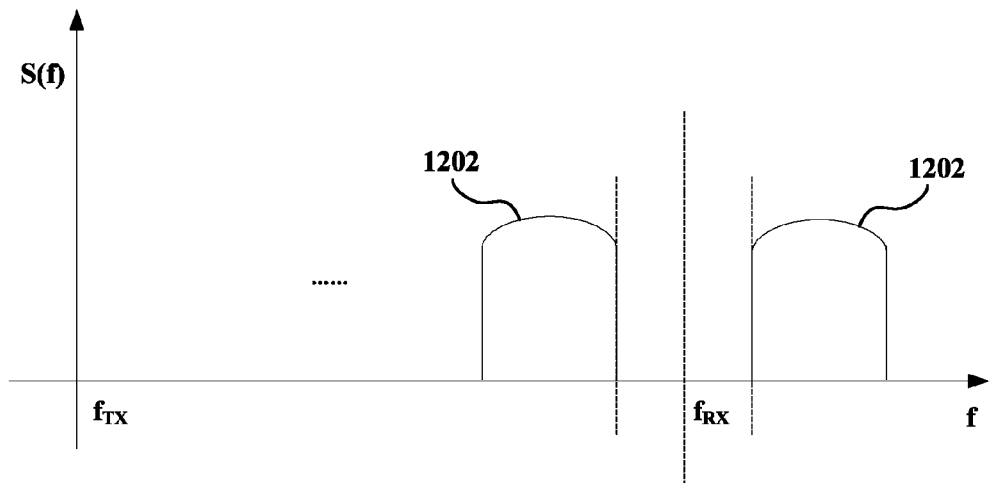
FIG. 15 is a schematic diagram of the distorted signals of larger amplitudes after frequency conversion of an embodiment of the present invention.

For example, in comparison with the receiving signals, the amplitudes of the distorted signals are relatively large, which may block the receiving signals and increase the quantized errors of the receiving signals. FIG. 15 is a schematic diagram of the distorted signals of larger amplitudes after frequency conversion. As shown in FIG. 15, if the receiving signals shown in FIG. 12 are directly coupled, it is possible that the receiving signals are affected, lowering the accuracy in processing signals. The distorted signals shown in FIG. 15 may be adjusted into the signals shown in FIG. 13 by the amplitude adjusting unit 1108, so as to obtain the signals shown in FIG. 14. In this way, the accuracy in processing signals may be further improved.

Furthermore, as shown in FIG. 11, the predistortion unit 1109 may generate distortion parameters according to the distorted signals obtained by the signal processing unit 1106, and feed the distortion parameters back to a baseband processing part 1103.

Furthermore, the generation of the distortion parameters by the predistortion unit 1109 according to the distorted signals may comprise: calculating the power or amplitude of the distorted signals; and generating the distortion parameters when the power or amplitude is minimal.

For example, the distorted signals may comprise in-phase (I) signals and quadrature-phase (Q) signals. The amplitudes of the I signals and Q signals may be calculated, for example, $|I|+|Q|$, and the distortion parameters are generated when $|I|+|Q|$ is minimal. However, it is not limited thereto, and detailed implementations may be determined as actually required.

In this embodiment, the coefficient adjustment is completed after the comparison of the power of the distorted signals before and after adjustment, and the optimal coefficient makes the power of the distorted signals minimal, which is different from the prior art in which the predistortion parameters are generated after the comparison of the original transmission signals with the distorted feedback signals. Therefore, it is not needed to temporally synchronize the transmission signals and the feedback signals containing distortion information accurately.

It can be seen from the above embodiment that by obtaining distorted signals from the output signals of a transmitting circuit and coupling the distorted signals to the signals of a receiving circuit, not only an analog receiving circuit may be reused, but also applicable to a half duplexing system and a full duplexing system. Furthermore, the requirement on the analog receiving circuit may be lowered, thereby reducing the cost, and needing no accurate temporal synchronization.

Figure 16:
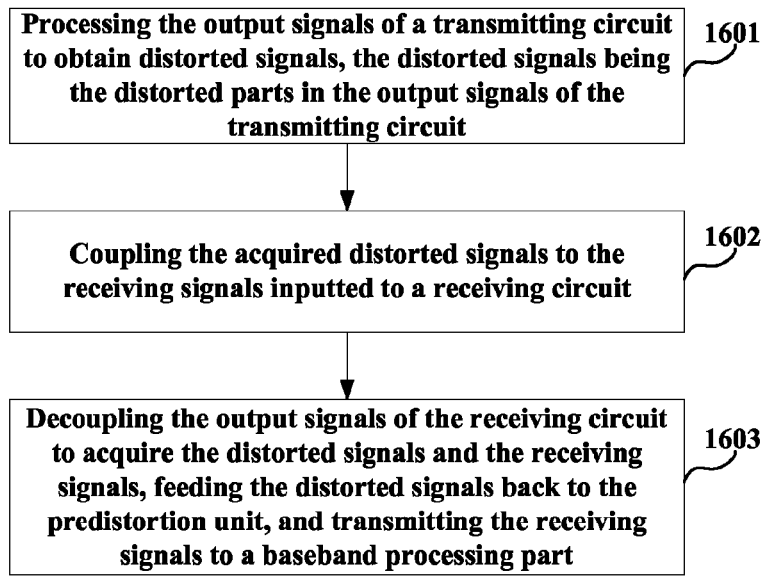
FIG. 16 is a flowchart of the method for predistortion of an embodiment of the present invention.

The embodiments of the present invention further provide a method for predistortion. As shown in FIG. 16, the method for predistortion comprises the steps of:

step 1601: processing the output signals of a transmitting circuit to obtain distorted signals, the distorted signals being the distorted parts in the output signals of the transmitting circuit;

step 1602: coupling the acquired distorted signals to the receiving signals inputted to a receiving circuit, so that the distorted signals are transmitted by reusing the receiving circuit; and step 1603: decoupling the output signals of the receiving circuit to acquire the distorted signals and the receiving signals, to feed the distorted signals back to the predistortion unit, and to transmit the receiving signals to a baseband processing part.

In an embodiment, in executing step 1601, the processing the output signals of the transmitting circuit to obtain the distorted signals may comprise: filtering by a filter the in-band signals in the output signals of the transmitting circuit to obtain the distorted signals.

In another embodiment, in executing step 1601, the processing the output signals of the transmitting circuit to obtain the distorted signals may comprise: reversing the in-band signals in the output signals of the transmitting circuit; and synthesizing the obtained reversed signals and the output signals of the transmitting circuit, so as to obtain the distorted signals.

Furthermore, before coupling the acquired distorted signals to the input signals of the receiving circuit, the method may comprise: performing frequency conversion on the acquired distorted signals; and coupling the distorted signals after frequency conversion to the signals of the receiving circuit.

Furthermore, before coupling the acquired distorted signals to the input signals of the receiving circuit, the method may comprise: adjusting the amplitudes of the signals after frequency conversion; and coupling the distorted signals after adjustment of amplitudes to the signals of the receiving circuit.

In this embodiment, after decoupling the signals of the receiving circuit to acquire the distorted signals in step 1603, the method further comprises: generating distortion parameters according to the distorted signals; and feeding the distortion parameters back to the baseband processing part.

In particular, the generating distortion parameters according to the distorted signals may comprise: calculating the power or amplitude of the distorted signals; and generating an optimal distortion parameter when the power or amplitude is minimal.

The embodiments of the present invention further provide a transmitter/receiver system, comprising a baseband processing part, a transmitting circuit and a receiving circuit, and the transmitter/receiver system further comprises the predistortion device as described above. The transmitter/receiver system will be further described below with reference to an embodiment.

Figure 17:
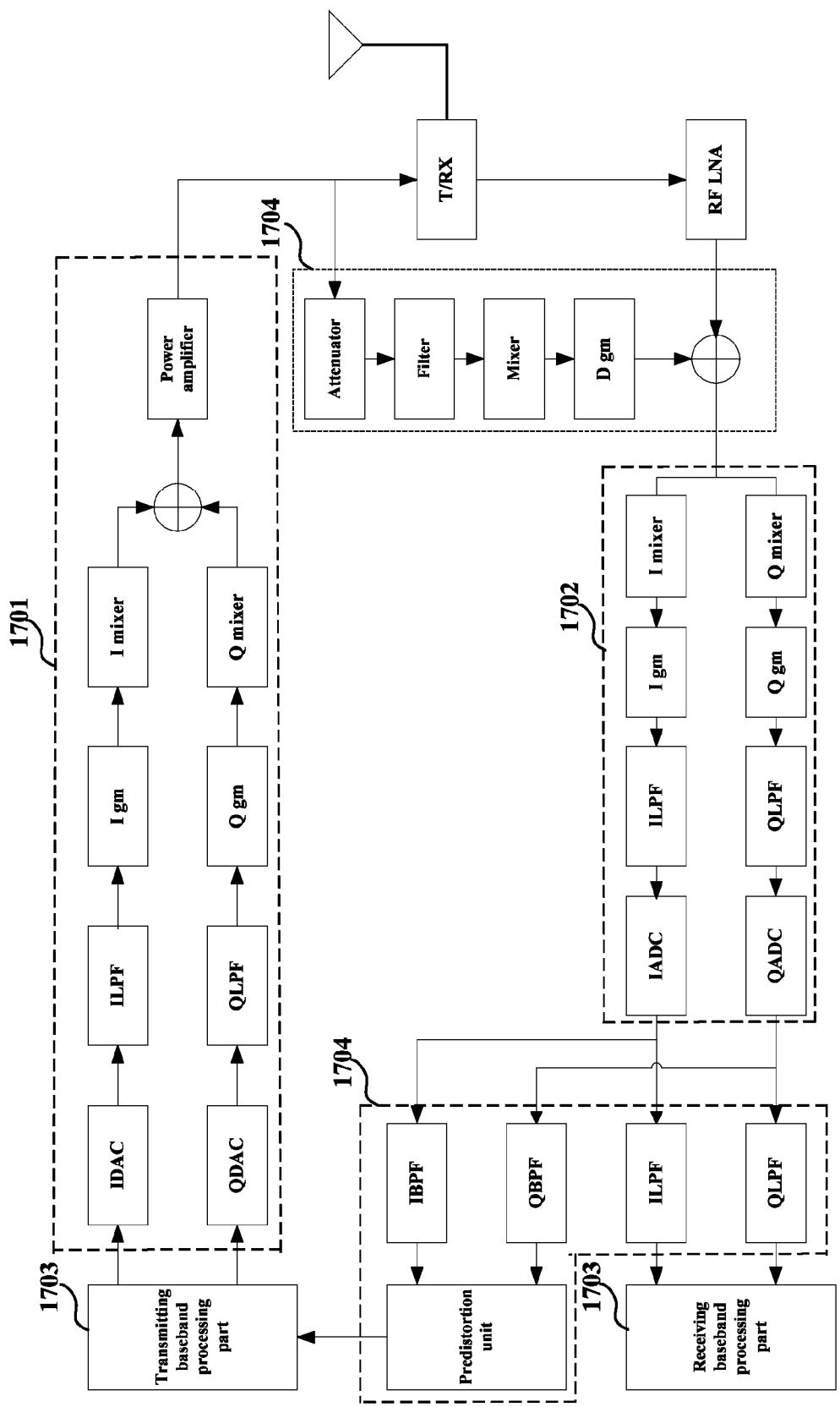
FIG. 17 is a schematic diagram of an example of the transmitter/receiver system of an embodiment of the present invention.

FIG. 17 is a schematic diagram of an example of the transmitter/receiver system of an embodiment of the present invention. As shown in FIG. 17, the transmitter/receiver system may comprise a transmitting circuit 1701, a receiving circuit 1702, and a baseband processing part 1703; and furthermore, the transmitter/receiver system comprises a predistortion device 1704. Wherein the baseband processing part 1703 may comprise a transmit baseband processor and a receive baseband processor; the transmitting circuit 1701 may comprise a digital to analog converter (IDAC, QDAC), a lowpass filter (ILPF, QLPF), a gm (I gm, Q gm), a mixer (I mixer, Q mixer), and a power amplifier. The receiving circuit 1702 may comprise an analog to digital converter (IADC, QADC), a lowpass filter (ILPF, QLPF), a gm (I gm, Q gm), and a mixer (I mixer, Q mixer).

Preferably, in this embodiment, the predistortion device 1704 may comprise a filer, a signal coupling unit, a signal processing unit and a predistortion unit. Wherein the signal processing unit may comprise a bandpass filter (IBPF, QBPF) for acquiring distorted signals from the output signals of the receiving circuit; and it may further comprise a lowpass filter (ILPF, QLPF) for acquiring receiving signals from the output signals of the receiving circuit. Furthermore, the predistortion device 1704 may comprise an attenuator, a mixer, and a D gm.

It can be seen from the above embodiment that by obtaining distorted signals from the output signals of a transmitting circuit and coupling the distorted signals to the signals of a receiving circuit, not only an analog receiving circuit may be reused, but also applicable to a half duplexing system and a full duplexing system. Furthermore, the requirement on the analog receiving circuit may be lowered, thereby reducing the cost, and needing no accurate temporal synchronization.

It may be further understood by an ordinary person in the art that the illustrated elements and steps described with reference to the embodiments disclosed in this text may be implemented by electronic hardware, computer software, or a combination thereof. For the clarity of the description of the interchangeability of the hardware and the software, the illustrated compositions and steps have been generally described with respect to their functions. The execution of these functions by hardware or software is dependent on the particular application of the technical solution and limiting conditions of the design. Those specialized technicians may use different methods for each particular application to execute the described functions; however, such an execution should not be deemed as going beyond the scope of the present invention.

The steps of the method or algorithm described with reference to the embodiments disclosed in this text may be implemented by hardware, a processor-executed software module, or a combination thereof. The software module may be placed in a random access memory (RAM), a memory, a read-only memory (ROM), an electronic programmable ROM, an electronic erasable programmable ROM, a register, a hard disk, a mobile disk, a CD-ROM, or any other storage media known in the art.

The object, technical solution and advantages of the present invention are described in detail with reference to the above particular embodiments. It should be understood that what is described above is merely particular embodiments of the present invention, and is not intended to limit the protection scope of the present invention. Any modification, equivalence, and improvement, etc. made within the spirits and principle of the present invention should be covered by the protection scope of the present invention.

For the implementation of the present invention containing the above embodiments, following supplements are further disclosed.

(Supplement 1). A predistortion device, comprising a predistortion unit, and the predistortion device further comprises:

a signal acquiring unit connected to a transmitting circuit to process the output signals of the transmitting circuit so as to obtain distorted signals, the distorted signals being the distorted parts in the output signals of the transmitting circuit;

a signal coupling unit to couple the distorted signals acquired by the signal acquiring unit to the receiving signals inputted to a receiving circuit; and a signal processing unit to decouple the output signals of the receiving circuit to acquire the distorted signals and the receiving signals, to feed the distorted signals back to the predistortion unit, and to transmit the receiving signals to a baseband processing part.

(Supplement 2). The predistortion device according to supplement 1, wherein the signal acquiring unit is a filter, the filter filters the in-band signals in the output signals of the transmitting circuit to obtain the distorted signals.

(Supplement 3). The predistortion device according to supplement 1, wherein the signal acquiring unit comprises:

a phase reversing unit to reverse the phase of the in-band signals in the output signals of the transmitting circuit; and a synthesizing unit to synthesize the reversed phase signals output by the phase reversing unit and the output signals of the transmitting circuit to obtain the distorted signals.

(Supplement 4). The predistortion device according to supplement 1, wherein the predistortion device further comprises:

a frequency conversion processing unit to convert the frequencies of the distorted signals acquired by the signal acquiring unit, and to transmit the distorted signals after frequency conversion to the signal coupling unit.

(Supplement 5). The predistortion device according to supplement 4, wherein the predistortion device further comprises:

an amplitude adjusting unit to adjust the amplitude of the signals output by the frequency conversion processing unit according to the amplitude of the receiving signals, and to transmit the distorted signals after amplitude adjustment to the signal coupling unit.

(Supplement 6). The predistortion device according to supplement 1, wherein the predistortion unit generates distortion parameters according to the distorted signals obtained by the signal processing unit, and feeds the distortion parameters back to the baseband processing unit.

(Supplement 7). The predistortion device according to supplement 6, wherein the predistortion unit is used to calculate the power or amplitude of the distorted signals, and to generate the distortion parameters when the power or amplitude is minimal.

(Supplement 8). A method for predistortion, comprising:

processing the output signals of a transmitting circuit to obtain distorted signals, the distorted signals being the distorted parts in the output signals of the transmitting circuit;

coupling the acquired distorted signals to the receiving signals inputted to a receiving circuit, so that the distorted signals are transmitted by reusing the receiving circuit; and decoupling the output signals of the receiving circuit to acquire the distorted signals and the receiving signals, to feed the distorted signals back to the predistortion unit, and to transmit the receiving signals to a baseband processing part.

(Supplement 9). The method for predistortion according to supplement 8, wherein the processing the output signals of the transmitting circuit to obtain the distorted signals comprises:

filtering by a filter the in-band signals in the output signals of the transmitting circuit to obtain the distorted signals.

(Supplement 10). The method for predistortion according to supplement 8, wherein the processing the output signals of the transmitting circuit to obtain the distorted signals comprises:

reversing the phase of the in-band signals in the output signals of the transmitting circuit and synthesizing the obtained reversed phase signals and the output signals of the transmitting circuit to obtain the distorted signals.

(Supplement 11). The method for predistortion according to supplement 8, wherein before the acquired distorted signals are coupled to the receiving signals inputted to the receiving circuit, the method further comprises:

frequency converting the acquired distorted signals, and coupling the processed distorted signals to the receiving signals inputted to the receiving circuit.

(Supplement 12). The method for predistortion according to supplement 11, wherein before the acquired distorted signals are coupled to the receiving signals inputted to the receiving circuit, the method further comprises:

frequency converting and amplitude adjusting the distorted signals, and coupling the processed distorted signals to the receiving signals inputted to the receiving circuit.

(Supplement 13). The method for predistortion according to supplement 8, wherein after the decoupling the output signals of the receiving circuit to acquire the distorted signals, the method further comprises:

generating distortion parameters according to the obtained distorted signals, and feeding the distortion parameters back to the baseband processing part.

(Supplement 14). The method for predistortion according to supplement 13, wherein the generating distortion parameters according to the obtained distorted signals comprises:

calculating the power or amplitude of the distorted signals, and generating the distortion parameters when the power or amplitude is minimal.

(Supplement 15). A transmitter/receiver system, comprising a baseband processing part, a transmitting circuit and a receiving circuit, and the transmitter/receiver system further comprises the predistortion device as stated in any of supplements 1-7.

The invention claimed is:

1. A predistortion device, comprising a predistortion unit, and the predistortion device further comprises:
    a signal acquiring unit connected to a transmitting circuit configured process an output signal of the transmitting circuit so as to obtain a distorted signal, the distorted signal being an out-band distorted part in the output signal of the transmitting circuit;
    a signal coupling unit configured to couple the distorted signal acquired by the signal acquiring unit to a receiving signal inputted to a receiving circuit; and
    a signal processing unit configured to decouple the output signal of the receiving circuit to acquire the distorted signal and the receiving signal, to feed the distorted signal back to the predistortion unit, and to transmit the receiving signal to a baseband processing part.

2. The predistortion device according to claim 1, wherein the signal acquiring unit is a filter, the filter filtering an in-band signal in the output signal of the transmitting circuit to obtain the distorted signal.

3. The predistortion device according to claim 1, wherein the signal acquiring unit comprises:
    a phase reversing unit configured to reverse a phase of an in-band signal in the output signal of the transmitting circuit; and
    a synthesizing unit configured to synthesize the reversed phase signal output by the phase reversing unit and the output signal of the transmitting circuit to obtain the distorted signal.

4. The predistortion device according to claim 1, wherein the predistortion device further comprises:
    a frequency conversion processing unit configured to convert a frequency of the distorted signal acquired by the signal acquiring unit, and to transmit the distorted signal after frequency conversion to the signal coupling unit.

5. The predistortion device according to claim 4, wherein the predistortion device further comprises:
    an amplitude adjusting unit configured to adjust an amplitude of the signal output by the frequency conversion processing unit according to the amplitude of the receiving signal, and to transmit the distorted signal after amplitude adjustment to the signal coupling unit.

6. The predistortion device according to claim 1, wherein the predistortion unit calculates the power or amplitude of the distorted signal obtained by the signal processing unit to generate a distortion parameter when the power or amplitude is minimal.

7. A method for predistortion, comprising:
processing an output signal of a transmitting circuit to obtain a distorted signal, the distorted signal being an out-band distorted part in the output signal of the transmitting circuit;
coupling the acquired distorted signal to a receiving signal inputted to a receiving circuit, so that the distorted signal is transmitted by reusing the receiving circuit; and
decoupling the output signal of the receiving circuit to acquire the distorted signal and the receiving signal, to feed the distorted signal back to the predistortion unit, and to transmit the receiving signal to a baseband processing part.

8. The method according to claim 7, wherein the processing the output signal of a transmitting circuit to obtain distorted signal comprises:
filtering, by a filter, an in-band signal in the output signal of the transmitting circuit to obtain the distorted signal; or
reversing a phase of an in-band signal in the output signal of the transmitting circuit and synthesizing the obtained reversed phase signal and the output signal of the transmitting circuit to obtain the distorted signal.

9. The method according to claim 7, wherein before the acquired distorted signal is coupled to the receiving signal inputted to the receiving circuit, the method further comprises:
frequency converting the acquired distorted signal or frequency converting and amplitude adjusting the acquired distorted signal; and
coupling the processed distorted signal to the receiving signal inputted to the receiving circuit.

10. A transmitter/receiver system, comprising a baseband processing part, a transmitting circuit and a receiving circuit, and the transmitter/receiver system further comprises the predistortion device as claimed in claim 1.

* * * * *